United States Patent [19]

Baker

[11] 3,898,809

[45] Aug. 12, 1975

[54] MOTOR VEHICLE OPEN-CENTER SERIES HYDRAULIC CIRCUIT WITH ACCUMULATOR

[75] Inventor: James P. Baker, Portland, Oreg.

[73] Assignee: The Weatherhead Company, Cleveland, Ohio

[22] Filed: Nov. 29, 1973

[21] Appl. No.: 419,999

[52] U.S. Cl. .................. 60/404; 60/413; 60/548; 91/28; 91/32
[51] Int. Cl. ..................... F15b 1/02; F15b 20/00
[58] Field of Search ............ 60/548, 403, 404, 405, 60/413, 582; 91/391, 6, 28, 31, 32, 433; 137/554, 113

[56] References Cited
UNITED STATES PATENTS

| | | | |
|---|---|---|---|
| 3,633,363 | 6/1970 | Larsen | 69/548 |
| 3,706,321 | 12/1972 | Vicari | 137/554 |
| 3,741,244 | 6/1973 | Ise | 137/554 |

Primary Examiner—Irwin C. Cohen
Assistant Examiner—Edward Look
Attorney, Agent, or Firm—McNenny, Farrington, Pearne & Gordon

[57] ABSTRACT

A motor vehicle fluid power circuit is disclosed in which a pump driven by the engine of the vehicle assists the operator in braking the vehicle and in steering the vehicle. The circuit includes a pump, a brake booster, a steering valve and an accumulator. A valve spool throttles fluid flow from the pump to the steering valve to maintain the outlet pressure of the pump at least a predetermined pressure differential above the working pressure of the brake booster under normal operating conditions. In the event of failure of the pump, the valve spool hydraulically connects the accumulator to the brake booster through a solenoid valve. The solenoid valve prevents flow of fluid from the accumulator to the brake booster except during actual brake pedal actuation to prevent leakage in the event of pump failure.

16 Claims, 1 Drawing Figure

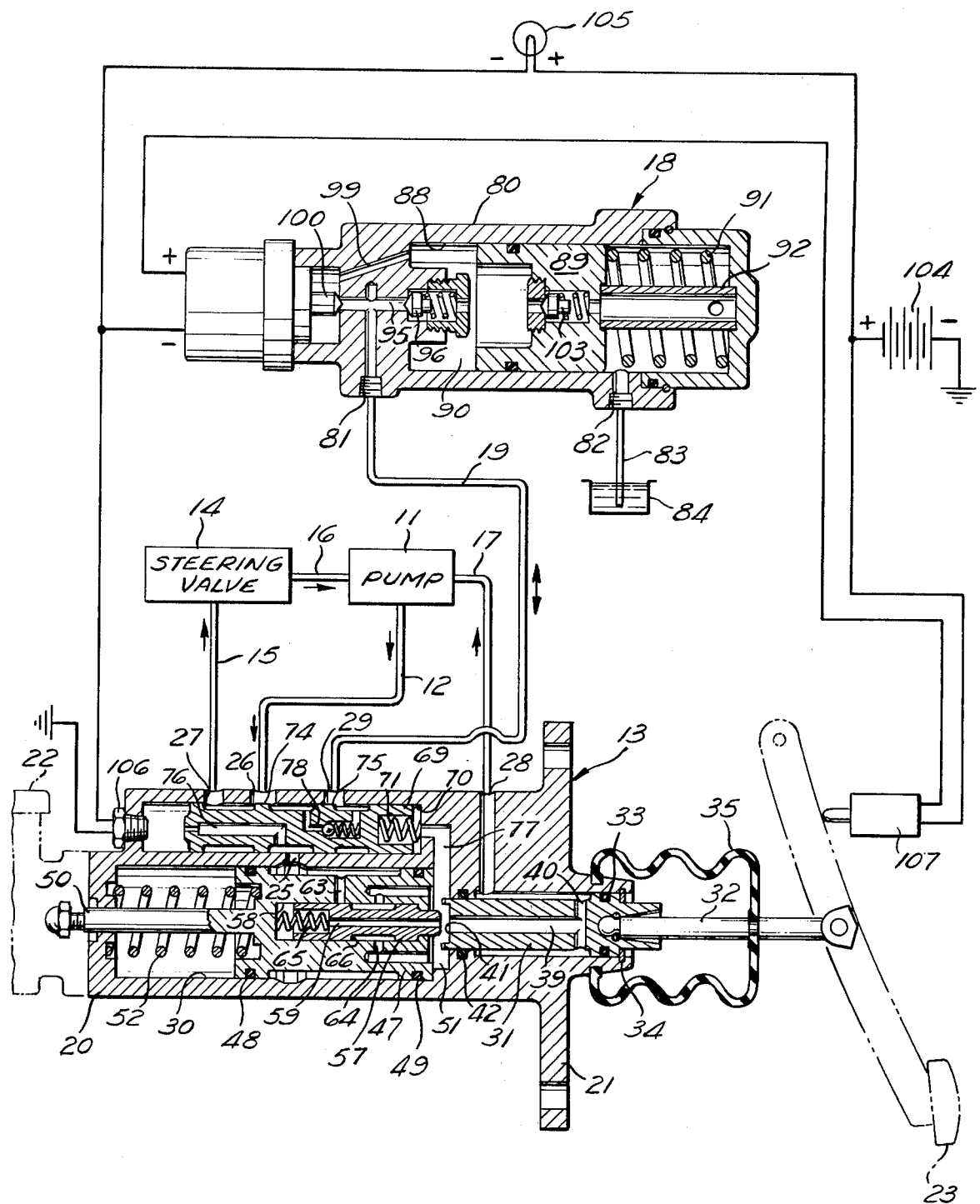

MOTOR VEHICLE OPEN-CENTER SERIES HYDRAULIC CIRCUIT WITH ACCUMULATOR

BACKGROUND OF THE INVENTION

This invention relates generally to a hydraulic fluid power circuit, and more particularly to a motor vehicle hydraulic fluid power circuit having a hydraulic pump for supplying fluid to assist the operator in steering and braking the vehicle.

Motor vehicles are frequently provided with a hydraulic pump which is driven by the engine of the vehicle to provide a source of fluid power. In passenger cars, this fluid power is frequently used to assist the operator in steering the vehicle. Because of increasing automobile braking performance requirements and because of a decreasing ability of intake manifold vacuum braking systems to provide that performance, it has been suggested to use the fluid power of the engine driven hydraulic pump to assist the operator in braking the vehicle, as well as to assist the operator in steering the vehicle.

CROSS REFERENCE TO RELATED APPLICATION

Reference is made to the copending U.S. Pat. application of applicant, Ser. No. 379,319, filed July 16, 1973 and assigned to the assignee of this application.

SUMMARY OF THE INVENTION

The present invention provides a fluid power circuit for a motor vehicle for assisting the operator in steering and braking the vehicle. A valve spool maintains the outlet pressure of the pump a predetermined pressure differential above the required working pressure of the brake booster under normal (i.e., non-emergency) operating conditions to conserve the output load requirements of the pump. An accumulator provides a reserve capacity for the circuit, and the valve spool connects the accumulator to the brake booster through a solenoid valve in the event of failure of the pump.

More specifically, the present invention provides a motor vehicle fluid power circuit which includes a pump driven by the engine of the vehicle, a steering valve, a brake booster, and an accumulator. First means are provided hydraulically connecting the pump to the brake booster and to the steering valve. A control spool is provided for throttling fluid flow from the pump to the steering valve to maintain the outlet pressure of the pump at least a predetermined pressure differential above the working pressure of the brake booster under normal operating conditions in order to conserve output load requirements of the pump.

In the event of a fluid pressure failure in the pump, the control spool hydraulically connects the accumulator to the brake booster through a solenoid valve and hydraulically isolates the accumulator and brake booster from the pump and steering valve.

DESCRIPTION OF THE PREFERRED EMBODIMENT

These and other aspects and advantages of the invention are incorporated in the preferred embodiment of the invention shown in the drawing, which is a schematic circuit diagram of a motor vehicle fluid power circuit according to the principles of the invention, with the brake booster and the accumulator shown in cross-section.

A. Structure

The circuit shown in the drawing includes a hydraulic pump 11 providing a source of fluid power for the circuit. The pump 11 is driven by the engine of the motor vehicle (not shown), and in the preferred embodiment the pump 11 is a constant displacement pump having an output of 2.5 gallons per minute and is of the type commonly used in motor vehicle power steering systems at the present time. The pump 11, in a well known manner, includes an internal relief valve which connects the outlet of the pump to the inlet of the pump when a predetermined maximum pressure is reached to prevent damage to the pump or to the remainder of the circuit. In the embodiment shown in the drawing, the internal relief pressure of the pump 11 is set at 1,200 p.s.i.

A suitable line 12 carries the entire output of the pump 11 to a brake booster 13. The brake booster 13, as discussed in detail below, uses no fluid whatsoever from the pump 11 except during brake actuation movement. Fluid from the pump 11 which is not used by the brake booster 13 flows to a steering valve 14 through a line 15. Drain lines 16 and 17 provide a return flow path to the pump 11 from the steering valve 14 and brake booster 13, respectively. An accumulator 18 provides a reserve supply of fluid for the brake booster 13 in the event of a fluid pressure failure of the pump 11, and a line 19 provides a flow path in both directions between the brake booster 13 and the accumulator 18.

The steering valve 14 is of the type conventionally used in automobiles at the present time. The steering valve 14 directs the fluid which it receives back to the pump 11 through drain line 16 when the steering valve is in its neutral or center position. When fluid from the pump 11 is required to assist in the steering of the vehicle and the steering valve 14 is displaced from its center position, the steering valve 14 directs at least some of the fluid received through the line 15 to a fluid motor (not shown) of the motor vehicle power steering system in a well known manner.

The brake booster 13 includes a generally cylindrical axially extending housing 20. An annular mounting flange 21 is provided on the right end of the housing 20 for securing the brake booster 13 to a firewall (not shown) of the motor vehicle. The brake booster 13 is interposed between a foot-operated brake pedal 23 of the motor vehicle and a master cylinder 22 of the motor vehicle to assist the operator in the application of the brakes in a manner discussed in detail below.

The housing 20 includes an inlet port or pump port 26 which is hydraulically connected to the line 12 to receive the entire output of the pump 11 under all conditions. A first outlet port or steering valve port 27 is hydraulically connected to the line 15 to supply the fluid from the pump 11 which is not used by the brake booster 13 to the steering valve 14. As described in greater detail below, the brake booster 13 allows the entire output of the pump 11 to be supplied to the steering valve 14 except during brake actuation movement of the brake booster 13 or charging of the accumulator 18. A second outlet port or drain port 28 is hydraulically connected to the line 17 to return the fluid which is used by the brake booster 13 during brake actuation movement to the inlet of the pump 11 upon brake release. An accumulator port 29 is hydraulically connected to the accumulator line 19 for supplying fluid to and receiving fluid from the accumulator 18. A power chamber port 25 leads to the power chamber of the brake booster 13 as described below. As shown in the drawing, the pump port 26 is disposed in between the steering valve port 27 and the power chamber port 25, and the accumulator port 29 is disposed immediately to the right of the power chamber port 25.

As further shown in FIG. 1, a bore 30 extends axially through the housing 20. An input rod 31 is slidably disposed in the right end of the bore 30, and a connecting rod 32 is secured to the input rod 31 by a suitable retaining ring to connect the brake pedal 23 to the input rod 31. A seal 33 prevents fluid leakage between the input rod 31 and the right end of the bore 30, and a snap ring 34 prevents the input rod 31 from being pulled out of the right end of the bore 30. A suitable dust cap 35 is also provided to prevent dust or other contaminants from entering the right end of the bore 30.

An axially extending outlet passage 39 extends from one end of the input rod 31, and a radial passage 40 establishes open fluid pressure communication between the outlet passage 39 and the outlet port 28. An annular end portion 41 of the input rod 31 surrounds the passage 39 and provides an annular valve seat as described in greater detail below. A suitable seal 42 prevents fluid leakage between the bore 30 and the left end of the input rod 31.

A power piston 47 is also slidably disposed in the bore 30. A first seal 48 and a second seal 49 prevent fluid leakage between the power piston 47 and the bore 30. The power piston 47 includes an output rod 50 at its left end for exerting a force on the master cylinder 22 to which the brake booster 13 is connected. In the embodiment shown in the drawing, the output rod 50 is shown schematically as a single piece with the power piston 47, but the output rod 50 could alternatively be made as a separate piece. The right end of the power piston 47 cooperates with the bore 30 to define a power chamber 51. A return spring 52 urges the power piston 51 to the right to the position shown in the drawing.

A poppet 57, which may be of steel or other suitable material, is slidably disposed in a bore 58 in the power piston 47 and is carried by the power piston 47. An axial passage 59 extends through the poppet 57 so that the left end of the poppet 57 is exposed to drain line pressure in the outlet passage 39 under all conditions.

A power chamber inlet passage 63 extends from the outer periphery of the power piston 47 to the bore 58, and a passage 64 establishes fluid pressure communication between the bore 58 and the power chamber 51. A spring 65 biases the poppet 57 to the right to the position shown in the drawing in which a valving land 66 of the poppet 57 closes off the power chamber inlet passage 63 to hydraulically isolate the power chamber inlet passage 63 from the power chamber 51 when the brake booster is deactuated. When the poppet 57 is displaced to the left from the position shown in the figure, the valving land 66 moves to the left past the power chamber inlet passage 63 to establish throttled fluid pressure communication between the power chamber inlet passage 63 and the power chamber 51 through the passage 64 in a manner described in greater detail below.

A control spool 69 is slidably disposed in a bore 70 in the housing 20 and is spring-biased to the left from the position shown in the drawing by a coil spring 71.

Under normal operating conditions, a first land 74 defined by annular grooves on each side thereof on the control spool 69 throttles fluid flow from the pump 11 to the steering valve 14 and maintains the outlet pressure of the pump 11 at least a predetermined pressure differential above the working pressure of the brake booster fluid power chamber 51 in a manner described below. In the event of fluid pressure failure of the pump 11, a second land 75 also defined by annular grooves on each side thereof on the control spool 69 hydraulically connects the accumulator 18 to the power chamber inlet 63 and hydraulically isolates the accumulator 18 and power chamber inlet 63 from the pump 11 and steering valve 14 in a manner described below. A charging passage 78 extends through the control spool 69 for charging the accumulator 18 under normal operating conditions, and a one-way check valve is provided in the charging passage 78 to prevent fluid flow from the accumulator 18 and power chamber inlet 63 to the pump 11 and steering valve 14 in the event of fluid pressure failure of the pump 11 as described below.

A control passage 76 extends through the control spool 69 and communicates the pressure in the inlet port 26 (which is the same as the outlet pressure of the pump 11) the left end face of the control spool 69. A passage 77 in the housing 20 establishes fluid pressure communication between the power chamber 51 and the right end face of the control spool 69 (which in the preferred embodiment is of equal lateral cross-sectional area to the left end face of the control spool 69). In this manner, the control spool 69 is urged to the left by the spring 71 and by the pressure in the fluid power chamber 51 to close communication between the ports 26 and 27, and the control spool 69 is urged to the right by the outlet pressure of the pump 11 to open communication between the ports 26 and 27. When these opposed forces are equal, the control spool 69 is in a balanced condition and remains stationary. When these opposed forces are unequal, the control spool 69 is in an unbalanced condition and moves to the right or left in the bore 70.

The accumulator 18 includes a housing 80 having a pressure port 81 and a drain port 82. The pressure port 81 is hydraulically connected to the line 19 for receiving hydraulic fluid from and supplying hydraulic fluid to the accumulator port 29 of the brake booster 13. The drain port 82 is hydraulically connected to a line 83 which leads to a reservoir 84. The reservoir 84 is the reservoir or inlet of the pump 11, but a hydraulic connection between the reservoir 84 and the pump 11 is omitted from the schematic showing in the drawing for clarity.

A bore 88 extends from one end of the accumulator housing 80, and a piston 89 is slidably and sealingly disposed in the bore 88. The bore 88 and piston 89 define an accumulator charge chamber 90 which is supplied with high pressure fluid for emergency operation of the brake booster 13 in the event of failure of the pump 11. A strong compression spring 91 biases the piston 89 to the left as shown in the drawing to maintain the pressure in the accumulator charge chamber 90 as the piston 89 moves to the left from its fully charged position shown in the drawing during emergency operation. In the fully charged position shown in the drawing, the full charge of hydraulic fluid in the chamber 90 holds the piston 89 to the right against a tubular stop 92.

An inlet passage 95 having a one-way check valve 96 receives fluid from the line 19 to unseat the check valve 96 and charge the chamber 90 when the fluid pressure in the line 19 exceeds the fluid pressure in the chamber 90. When the pressure in the line 19 drops below the pressure in the chamber 90, the one-way check valve 96 prevents discharge of the chamber 90.

A discharge passage 99 having an electrically actuated solenoid valve 100 therein is provided to discharge fluid from the chamber 90 to the brake booster 13 under emergency conditions when the pump 11 has failed and the solenoid valve 100 is opened as described below. Under normal operating conditions, the solenoid valve 100 is closed to prevent fluid flow through the discharge passage 99.

A relief valve 103 is provided in the piston 89 to prevent excessive pressures in the chamber 90. The relief valve 103 is adjusted to open at a pressure greater than the 1,200 p.s.i. relief pressure of the pump 11, so that the relief valve 103 does not open under normal conditions. However, in the event the accumulator charge chamber 90 is fully charged with relatively cold hydraulic fluid which then increases in temperature and expands, the relief valve 103 prevents excessive pressure buildup in the chamber 90. Any such fluid flowing through the relief valve 103 flows through the tubular stop 92 and through suitable openings in the tubular stop 92 which communicate with the drain port 82 to return such fluid to the reservoir 84 of the pump 11.

The electrical circuit for actuating the solenoid valve 100 to open the valve 100 includes a battery 104 having its positive side connected to the positive side of an indicator lamp 105 on the dashboard of a motor vehicle. The negative side of the lamp 105 is electrically connected to a suitable contact switch 106. The contact switch 106 electrically connects the negative side of the lamp 105 to ground when the contact switch 106 is contacted by the control spool 69, such as occurs in the event of fluid pressure failure of the pump 11 as described below.

The positive side of the battery 104 is also connected to a brake pedal switch 107. The brake pedal switch 107 is open when the brake pedal 23 is deactuated as shown in the drawing, and the brake switch 107 closes to connect the positive side of the battery 105 to the positive side of the solenoid 100 when the brake pedal 23 is depressed. The negative side of the solenoid 100 is also connected to the contact switch 106 so that the negative side of the solenoid 100 is connected to ground only by movement of the control spool 69 in the event of fluid pressure failure of the pump 11.

In this manner, the indicator lamp 105 is continuously actuated by the contact switch 106 in the event of failure of the pump 11, and the solenoid 100 is actuated to open the discharge passage 99 only when the brake pedal switch 107 is closed by movement of the brake pedal 23 so that the discharge passage 99 is opened only when the pump 11 has failed and the brake pedal 23 is actuated.

B. Operation Under Normal Conditions

1. Steering Valve and Brake Booster Deactuated

Turning now to the normal operation of the circuit shown in the drawing, the various components of the circuit are shown with the steering valve 14 in its neutral or center position and with the brake booster 13 deactuated. With the components in this position, the entire output of the pump 11 flows through the line 12 and into the inlet port 26. When the pump 11 is initially started-up, the control spool 69 is held in the far left position by the spring 71 until the pump pressure acting through the passage 76 on the left end of the control spool 69 moves the control spool 69 to the right to the position shown in FIG. 1. The fluid from the pump 11 then flows from the inlet port 26, past the left edge of the land 74, and out the outlet port 27 to the steering valve 14. The fluid then flows through the open center steering valve 14 and through the drain line 16 back to the inlet of the pump 11.

Under these conditions, the control spool 69 maintains the outlet pressure of the pump 11 at a predetermined pressure differential above the drain line pressure in the power chamber 51. The force urging the control spool 69 to the right is the force created by the pump pressure acting on the left end of the control spool 69, and the force urging the control spool 69 to the left is the sum of the force of the spring 71 and the force of the drain line pressure in the power chamber 51 acting on the right end of the control spool 69. Because the left and right ends of the control spool 69 are of equal areas, the pump pressure must exceed the power chamber pressure for the spool 69 to remain in the position shown in the drawing due to the force of the spring 71. If the pump pressure does not exceed the pressure in the power chamber 51, the control spool 69 is moved to the left by the spring 71 so that the left edge of the land 74 further restricts the flow of fluid from the inlet port 26 to the steering valve 14 to increase the pump pressure. If the pump pressure exceeds the pressure in the power chamber 51 by more than the effective pressure of the spring 71, the control spool 69 is moved to the right so that the left edge of the land 74 decreases the restriction of fluid flow to the steering valve 14 to decrease the pump pressure. When the power chamber 51 is connected to the drain line 17 (which is at zero gauge pressure in the preferred embodiment), the left edge of the throttling land 74 restricts the flow of fluid from the pump 11 to the steering valve 14 enough that the outlet pressure of the pump 11 equals the effective pressure of the spring 71. In the preferred embodiment, the spring 71 is selected to maintain the outlet pressure of the pump 11 at 50 p.s.i. when the steering valve 14 is in its neutral position and the brake booster 13 is deactuated.

2. Steering Valve Actuation and Subsequent Brake Booster Actuation

When the brake booster is in its deactuated position shown in the drawing and the steering valve 14 is moved from its center position to restrict the flow of fluid from the line 15 to the drain line 16, the output pressure of the constant displacement pump 11 increases to overcome this restriction. This increased pump pressure is transmitted through the passage 76 and acts on the left end of the control spool 69 to move the control spool 69 further to the right from the position shown in the drawing. This moves the left edge of the throttling land 74 further to the right to further open the passage from the inlet port 26 to the first outlet port 27 to minimize pressure loss from the pump 11 to the steering valve 14. Under these conditions, the control spool 69 may move all the way to the right in the bore 70 until it engages the right end of the bore 70. When this occurs, the right end of the throttling land 74 will move to the right past the inlet port 26. However, because of the small clearance between the outer periphery of the control spool 69 and the inner surface of the bore 70, a leakage path is maintained between the inlet port 26 and the power chamber inlet passage 63 so that fluid is still supplied to the brake booster.

When the steering valve 14 is actuated in this manner so that the outlet pressure of the pump 11 is increased, the brake booster 13 can be actuated. When the vehicle operator moves the input rod 31 to the left as viewed in the drawing by applying a force to the brake pedal 23, the valve seat 41 engages the poppet 57. This hydraulically isolates the power chamber 51 from the outlet passage 39. Further movement of the input rod 31 to the left also moves the poppet 57 against the force of the spring 65 to the left until the valving land 66 of the poppet 57 moves slightly past the power chamber inlet passage 63. This establishes throttled fluid pressure communication between the high pump pressure in the power chamber port 25 and passage 63 and the fluid power chamber 51. This pressure which is admitted to the power chamber 51 acts against the power piston 47 and begins to move the power piston 47 to the left as viewed in the drawing. This increased pressure in the power chamber 51 also acts on the input rod 31 to provide a reaction force which the vehicle operator can feel through the connecting rod 32 and through the brake pedal 23.

If the input force on the input rod 31 applied by the operator of the vehicle remains constant, the increased pressure in power chamber 51 pushes the power piston 47 to the left while the input rod 31 remains stationary. The spring 65 retains the poppet 57 against the valve seat 41, so that the poppet 57 remains stationary against the valve seat 41 while the power piston 47 moves to the left until the valving land 66 closes the power chamber inlet passage 63. When this occurs, the fluid pressure in the power chamber 51 remains constant so that the braking effort applied through the output rod 50 on the master cylinder 22 remains constant.

If the vehicle operator applies an input force of increasing magnitude on the input rod 31, the input rod 31 will continue to move to the left with the power piston 47 to retain the valving land 66 in the open position until the desired amount of braking has been achieved. When the input force on the input rod 31 is released, the force of the fluid pressure in the chamber 51 moves the input rod 31 back to the right to separate the valve seat 41 from the poppet 57. This throttles the fluid in the power chamber 51 through the passages 39 and 40 to the outlet port 28 to release the force applied to the master cylinder 22 by the output rod 50.

If under these conditions of steering valve actuation and subsequent brake booster actuation, the brake booster requires a pressure greater than the pressure required by the steering valve 14, the control spool 69 increases the pump pressure to a pressure level above the working pressure of the brake booster in the power chamber 51 so that adequate pump pressure is always available for the brake booster 13. To accomplish this, the working pressure of the brake booster in the power chamber 51 acts on the right end of the control spool 69. When this pressure plus the effective pressure of the spring 71 exceed the force of the pump pressure acting to the right on the control spool 69, the control spool 69 moves to the left until the left side of the valving land 74 restricts the flow of fluid from the inlet port 26 to the steering valve 14 sufficiently to increase the outlet pressure of the pump 12. The output pressure of the pump 11 increases until the pump pressure acting to the right on the control spool 69 equals the working pressure of the brake booster 13 plus the effective pressure of the spring 71 acting to the left on the control spool 69. In this manner, the control spool 69 maintains the outlet pressure of the pump 11 at least a predetermined pressure differential (the amount of such predetermined pressure differential is equal to the effective pressure of the spring 71) above the working pressure in the brake booster 51.

After the brake booster 13 has been deactuated and the steering valve 14 is deactuated, the outlet pressure of the pump 11 decreases to the 50 p.s.i. minimum pressure level maintained by the control spool 69 in the manner described above.

3. Brake Booster Actuation and Subsequent Steering Valve Actuation

If the steering valve 14 is in the neutral position and the brake booster 13 is actuated, the control spool 69 maintains the outlet pressure of the pump 11 the aforementioned predetermined pressure differential above the working pressure of the brake booster in the fluid pressure chamber 51. As soon as the brake booster is actuated in the manner described above so that the fluid pressure from the power chamber inlet passage 63 is throttled past the valving land 66 into the power chamber 51, such increased pressure in the power chamber 51 acts on the control spool 69 and moves the control spool 69 further to the left as viewed in the drawing. This causes the left side of the land 74 to impose a further restriction on the flow of fluid from the pump 11 to the steering valve 14 so that the pressure in the pump 11 increases to get past this restriction. This action of the control spool 69 continues for all pressures in the power chamber 51.

If at any time during such actuation of the brake booster 13 the steering valve 14 is actuated, sufficient flow capacity from the pump 11 is always available to the steering valve 14. This is because the valving land 66 is dimensioned so that it can only open the power chamber inlet passage 63 a small amount even when it is pushed to the left by the input rod 31 until the input rod 31 engages the power piston 47. This provides a restrictive orifice under all conditions to limit the flow rate of fluid to the fluid power chamber 51 to insure adequate flow capacity for the steering valve 14.

As described in detail above with particular reference to the pump 11, the pump 11 includes an internal relief valve which connects the outlet of the pump to the inlet of the pump when the outlet of the pump reaches 1,200 p.s.i. The brake booster 13 shown in the drawing provides a safety relief valve which prevents the brake booster 13 from demanding a pressure in excess of 1,150 p.s.i. from the pump 11. This assures that the brake booster 13 can never, even under emergency stopping conditions, cause the pump 11 to reach its internal relief pressure of 1,200 p.s.i. which would cause the output flow rate of the pump 11 to decrease to zero so that there would be no flow for operation of the steering valve 14.

In the embodiment shown in the drawing, this is accomplished by the poppet 57. As described above, the axial passage 59 maintains the left end face of the poppet 57 at drain line pressure when the input rod 31 is moved to the left so that the valve seat 41 engages the poppet 57. When the valve seat 41 engages the poppet 57, the poppet 57 also has a net lateral cross-sectional area exposed to pressure in the power chamber 51. Under emergency stopping conditions of maximum braking effort, the left end face of the input rod 31 engages the right end face of the power piston 47. The spring 65 is arranged so that when this occurs a pressure of 1,150 p.s.i. in the power chamber 51 acting against the net lateral effective area of the poppet 57 which is exposed to pressure in the power chamber 51 moves the poppet 57 to the left. Because the input rod 31 can move no further to the left relative to the power piston 47 when this occurs, the poppet 57 moves away from the valve seat 41. This throttles fluid from the power chamber 51 to the outlet passage 39 and limits the pressure in the power chamber 51 to 1,150 p.s.i.

4. Accumulator Charging

When either the steering valve 14 or the brake booster 13 or both are actuated, the output pressure of the pump 11 increases in the manner described above. When this occurs, this increased pump pressure is communicated through the charging passage 78, past the one-way check valve in the charging passage 78, through the accumulator port 29 and the line 19, and to the inlet passage 95 of the accumulator 18. If the pressure in the inlet passage 95 exceeds the pressure in the chamber 90, the one-way check valve 96 is unseated so that fluid flows to the chamber 90 to charge the accumulator. On the other hand, if the pressure in the accumulator 90 is greater than the pressure in the inlet passage 95, the one-way check valve 96 remains seated. In this manner, the chamber 90 of the accumulator 18 is kept fully charged by the pump 11. As described above, during normal operation of the circuit shown in the drawing the solenoid valve 100 is closed so that the only flow from the line 19 to the chamber 90 is through the inlet passage 95.

C. Operation Under Emergency Conditions

In the event of fluid pressure failure of the pump 11, the accumulator 18 provides a reserve capacity of high pressure fluid for operation of the brake booster 13, and the control spool 69 hydraulically connects the accumulator port 29 to the power chamber port 25 and hydraulically isolates the accumulator port 29 and power chamber port 25 from the pump 11 and steering valve 14 so that fluid from the accumulator 18 cannot escape to the pump 11 or steering valve 14.

When such fluid pressure failure of the pump 11 occurs, the decreased pressure in the inlet port 26 and in the passage 76 acting to the left on the control spool 69 permits the spring 71 to push the control spool 69 to its far left position in the bore 70. When this occurs, the second land 75 of the control spool 69 moves to a position immediately to the right of the inlet port 26 so that the land 75 hydraulically isolates the accumulator port 29 and power chamber port 25 from the pump 11 and steering valve 14. It should be noted that the second land 75 prevents flow of fluid in a direction from the accumulator 18 to the power chamber port 25 when the spool 69 is in its normal operating position shown in the drawing, but when the spring 71 pushes the control spool 69 to its far left position the annular groove immediately to the right of the land 75 establishes fluid pressure communication between the accumulator port 29 and the power chamber port 25. It should also be noted that, when the control spool 69 is in this far left position, the one-way check valve in the charge passage 78 prevents flow of fluid from the accumulator port 29 in a direction toward the pump 11 and steering valve 14.

Movement of the control spool 69 to its leftward position also actuates the electrical circuit shown in the drawing. This is because the positive side of the indicator lamp 105 is connected to the positive side of the battery 104 under all conditions, and the negative side of the indicator lamp 105 is grounded when the control spool 69 contacts the contact switch 106.

This actuation of the electrical circuit also connects the negative side of the solenoid valve 100 to ground. However, the positive side of the solenoid valve 100 is connected to the positive side of the battery 104 only when the brake pedal 23 is depressed and the switch 107 thereby closed. In this manner, the solenoid valve 100 only opens the discharge passage 99 during actual brake application under emergency conditions, and the solenoid valve 100 closes the discharge passage 99 when the brakes are released to prevent leakage from the chamber 90 when the brakes are released.

In this manner, the indicator lamp 105 is continously actuated and the accumulator 18 is intermittently actuated by operation of the brake pedal 23 when there is a fluid pressure failure in the pump 11. The brake booster then operates in the same manner as described above, with high pressure communicated from the chamber 90 through the discharge passage 99 and the line 19, and through the accumulator port 29 to the power chamber port 25 under these emergency conditions with the control spool 69 in its far left position. The valving land 66 of the poppet 57 throttles fluid pressure from the power chamber inlet 63 to the power chamber 51 in the manner described above to actuate the brake booster for braking the vehicle. When the brake pedal 23 is released by the operator, the fluid in the power chamber 51 is drained through the outlet passage 39 and outlet port 28.

What is claimed is:

1. A motor vehicle fluid power circuit comprising a pump having an outlet side, a steering valve, a fluid pressure actuated brake booster, and an accumulator, first means hydraulically connecting said pump outlet side to said brake booster and hydraulically connecting said pump outlet side to said steering valve, valve spool means connected in said first means and having one end exposed to the pressure of said pump outlet side and another end exposed to the working pressure in said brake booster, said valve spool means in response to the working pressure in said brake booster on said other end throttling fluid flow from said pump outlet side and maintaining the pressure of said pump outlet side at at least a predetermined pressure differential above the working pressure of said brake booster under normal operating conditions, means hydraulically connecting said pump outlet side to said accumulator for charging thereof under normal operating conditions, means responsive to movement of said valve spool means in response to a fluid pressure failure in said pump pressure on said one end for supplying pressurized fluid from said accumulator to said valve spool means, and in response to said fluid pressure failure in said pump pressure on said one end said valve spool means hydraulically connects said accumulator fluid pressure to said brake booster and hydraulically isolates said accumulator and brake booster from said pump outlet side and steering valve.

2. A motor vehicle fluid power circuit as defined in claim 1 including an electrically actuated solenoid valve hydraulically connected to said accumulator and preventing fluid flow in a direction from said accumulator to said brake booster under normal operating conditions, and said means responsive to movement of said valve spool means including electrical actuating means to actuate said solenoid valve to permit fluid flow in a direction from said accumulator to said brake booster in response to a fluid pressure failure in said pump.

3. A motor vehicle fluid power circuit as defined in claim 1 including an electrically actuated solenoid valve hydraulically connected to said accumulator and preventing fluid flow in a direction from said accumulator to said brake booster under normal conditions, said brake booster includes an input rod movable between a deactuated position and an actuated position, and electrical switch means actuated by said input rod for preventing actuation of said solenoid valve when said input rod is in said deactuated position whereby fluid flow in a direction from said accumulator to said brake booster is always prevented when said input rod is in said deactuated position.

4. A motor vehicle fluid power circuit as defined in claim 1 wherein said valve spool means includes a control spool slidably disposed in a bore, said control spool includes a first land movable between an open position and a closed position for throttling fluid flow from said pump outlet side to said steering valve, and said control spool includes a second land hydraulically connecting said accumulator to said brake booster in response to a fluid pressure failure in said pump pressure on said one end.

5. A motor vehicle fluid power circuit as defined in claim 4 wherein said second land hydraulically isolates said brake booster from said accumulator under normal operating conditions.

6. A motor vehicle fluid power circuit as defined in claim 5 with said means hydraulically connecting said accumulator to said brake booster including a charging passage hydraulically connecting said pump outlet side to said accumulator when the fluid pressure level of said pump outlet side is greater than the fluid pressure level of said accumulator.

7. A motor vehicle fluid power circuit comprising a pump having an outlet side, a steering valve, a fluid pressure actuated brake booster having a power chamber and a power chamber inlet passage, and an accumulator, first means hydraulically connecting said pump outlet side to said brake booster and hydraulically connecting said pump outlet side to said steering valve, said first means including a bore, said bore having a pump port hydraulically connected to said pump outlet side and a steering valve port hydraulically connected to said steering valve and a power chamber port hydraulically connected to said brake booster power chamber inlet passage and an accumulator port hydraulically connected to said accumulator, said pump port being disposed at the middle of said bore, said steering valve port being disposed at one end of said bore, said accumulator port being disposed at the other end of said bore, and said power chamber port being disposed between said pump port and said accumulator port, a control spool slidably disposed in said bore, means connecting said brake booster power chamber to one of said ends of said bore, a first land on said control spool movable as a result of movement of said control spool responsive to the working pressure in said brake booster power chamber, between an open position and a closed position for throttling fluid flow from said pump port to said steering valve port and maintaining the pressure of said pump port at at least a predetermined pressure level above the working pressure in said brake booster power chamber, a second land on said control spool disposed between said accumulator port and said power chamber port under normal operating conditions, said first means further including means hydraulically connecting said pump outlet side to said accumulator for charging thereof under normal operating conditions and means responsive to movement of said control spool in response to a fluid pressure failure in said pump port for supplying pressurized fluid from said accumulator to said control spool, and biasing means moving said second land in a direction toward said one end of said bore to a position between said power chamber port and said pump port in response to a fluid pressure failure in said pump port, whereby said second land hydraulically connects said accumulator port to said power chamber port and hydraulically isolates said accumulator and power chamber ports from said pump and steering valve ports in response to a fluid pressure failure in said pump port.

8. A motor vehicle fluid power circuit as defined in claim 7 wherein said control spool includes one end face disposed in said one end of said bore and another end face disposed in said other end of said bore, said one end face is exposed to the fluid pressure in said pump port to urge said first land in a direction toward said open position, and said other end face is exposed to the fluid pressure in said brake booster power chamber to urge said first land in a direction toward said closed position.

9. A motor vehicle fluid power circuit as defined in claim 8 with said biasing means including a spring acting against said other end face of said control spool urging said first land in a direction toward said closed position, whereby said predetermined pressure differential is equal to the effective pressure of said spring acting against said other end face.

10. A motor vehicle fluid power circuit as defined in claim 7 wherein said pump is a constant displacement pump and said steering valve is an open center valve.

11. A motor vehicle fluid power circuit as defined in claim 7 with said means hydraulically connecting said pump outlet side to said accumulator including a charging passage for permitting fluid flow around said second land from said pump port to said accumulator port for charging said accumulator when the fluid pressure level in said pump port exceeds the fluid pressure level in said accumulator.

12. A motor vehicle fluid power circuit as defined in claim 11 including a one way check valve in said charging passage preventing flow of fluid in a direction from said accumulator port to said pump port.

13. A motor vehicle fluid power circuit as defined in claim 12 wherein said charging passage extends through said control spool and around said second land.

14. A motor vehicle fluid power circuit as defined in claim 7 including an electrically actuated solenoid valve hydraulically connected to said accumulator and said means responsive to movement of said control spool including an electrical actuating means for actuating said solenoid valve and engageable by said control spool, said solenoid valve preventing fluid flow in a direction from said accumulator to said brake booster under normal operating conditions, and said control spool electrically actuates said solenoid valve to permit fluid flow in a direction from said accumulator to said brake booster in response to a fluid pressure failure in said pump.

15. A motor vehicle fluid power circuit as defined in claim 7 including an electrically actuated solenoid valve hydraulically connected to said accumulator and preventing fluid flow in a direction from said accumulator to said brake booster under normal conditions; said brake booster includes an input rod movable between a deactuated position and an actuated position, and electrical switch means actuated by said input rod for preventing actuation of said solenoid valve when said input rod is in said deactuated position, whereby fluid flow in a direction from said accumulator to said brake booster is always prevented when said input rod is in said deactuated position.

16. A motor vehicle fluid power circuit as defined in claim 15 including an electrically actuated failure indicator means, said means responsive to movement of said control spool including an electrical actuating means for actuating said indicator means and engageable by said control spool, and said control spool continuously actuates said failure indicator means in response to a fluid pressure failure in said pump port, whereby said failure indicator means is continously actuated and said solenoid valve is intermittently actuated in response to a fluid pressure failure in said pump port.

* * * * *